Jan. 9, 1923.
JOSEPH D'AUTEMARRE D'ERVILLE.
BLOCK AND PANEL FOR KNOCKDOWN STRUCTURES.
FILED JUNE 30, 1920.
1,441,970.
8 SHEETS—SHEET 1.
Fig. 1
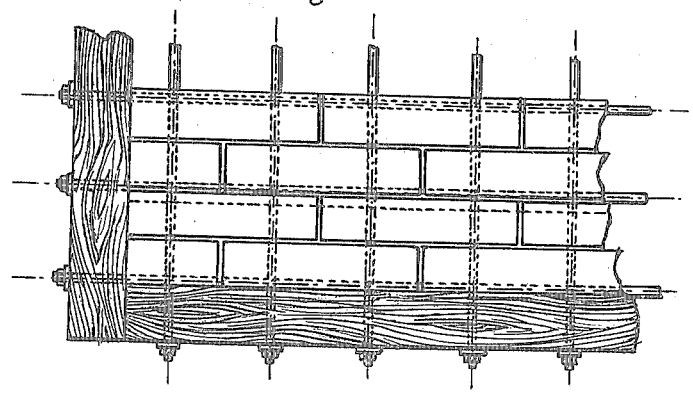
FIG. 1½.
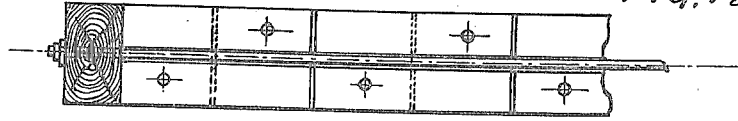
Fig. 2
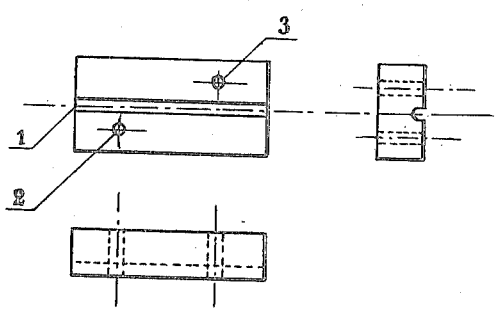
Fig. 3
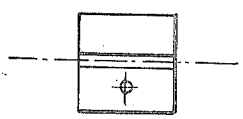
Fig. 4
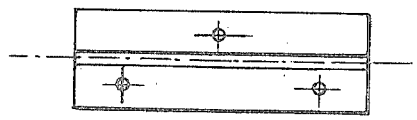
Inventor
Joseph d'A. d'Erville
By B. Singer, Atty.

Jan. 9, 1923.
JOSEPH D'AUTEMARRE D'ERVILLE.
BLOCK AND PANEL FOR KNOCKDOWN STRUCTURES.
FILED JUNE 30, 1920.
1,441,970.
8 SHEETS—SHEET 2.
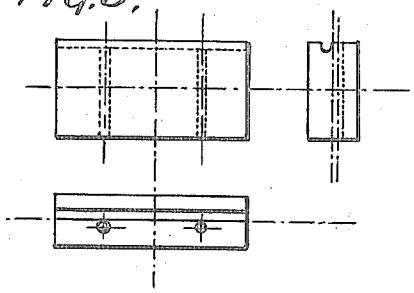
FIG.5.
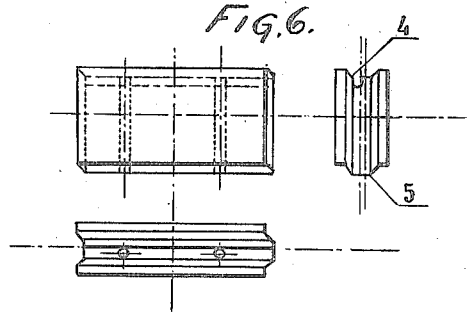
FIG.6.
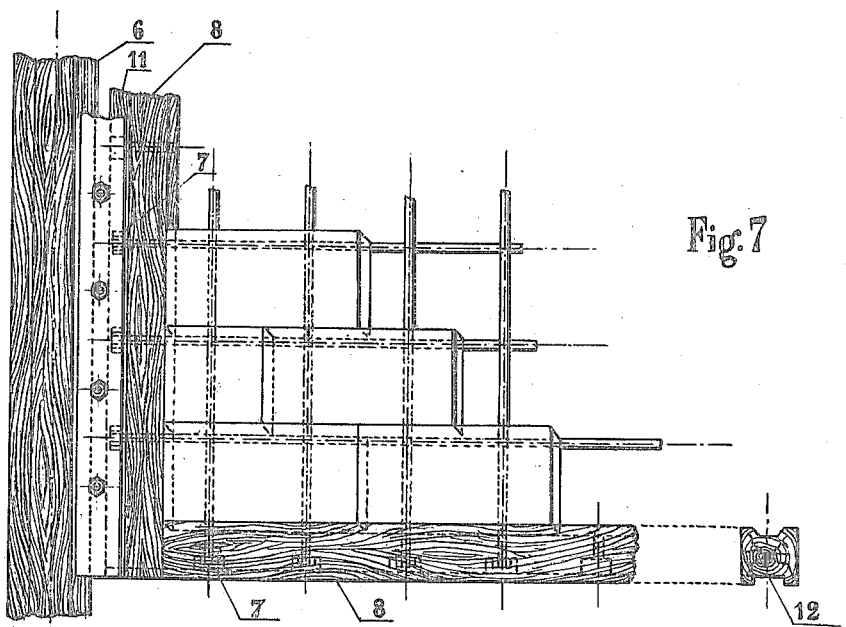
Fig.7
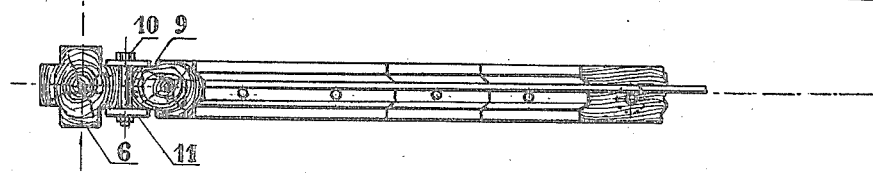
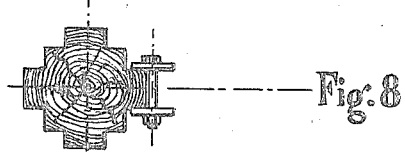
Fig.8

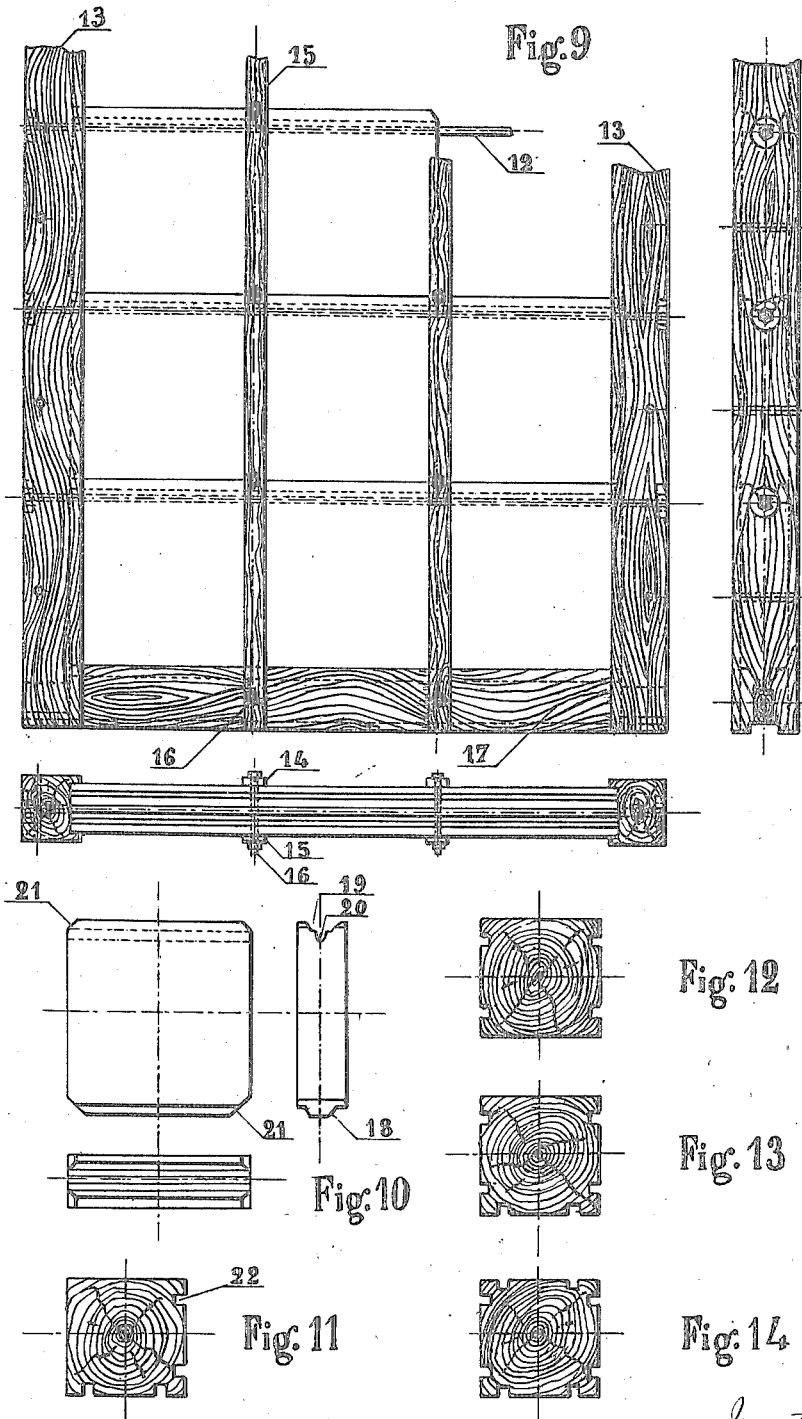

Jan. 9, 1923.
JOSEPH D'AUTEMARRE D'ERVILLE.
BLOCK AND PANEL FOR KNOCKDOWN STRUCTURES.
FILED JUNE 30, 1920.
1,441,970.
8 SHEETS—SHEET 4.
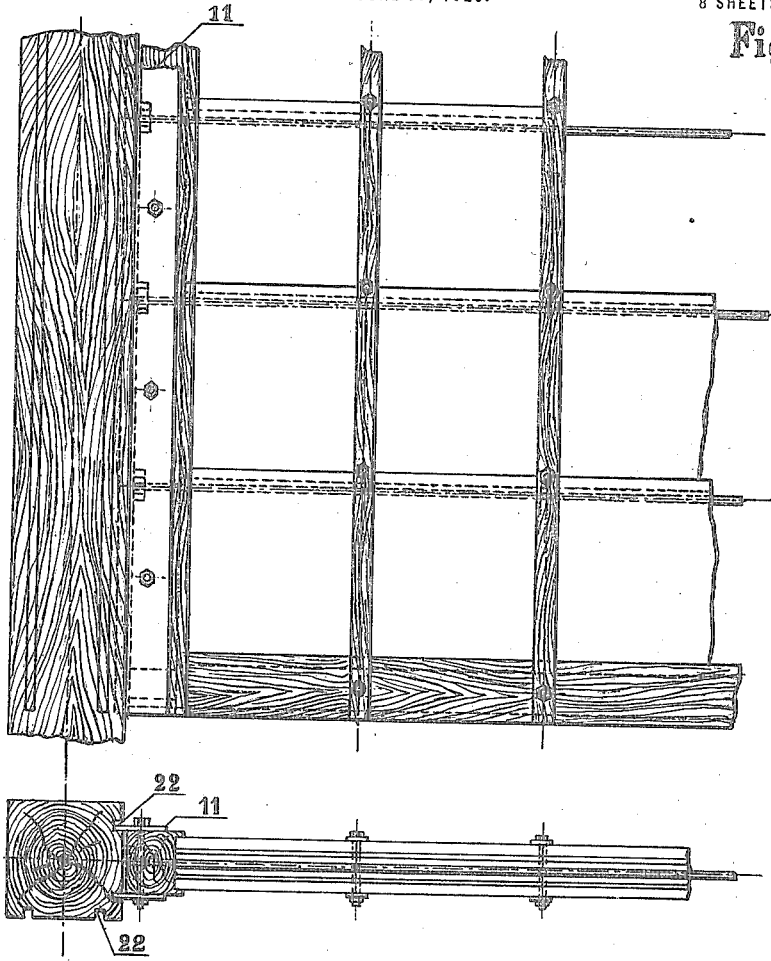
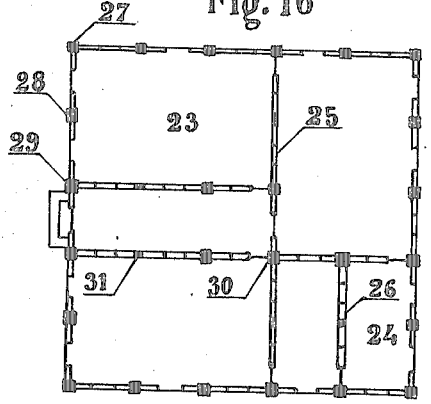
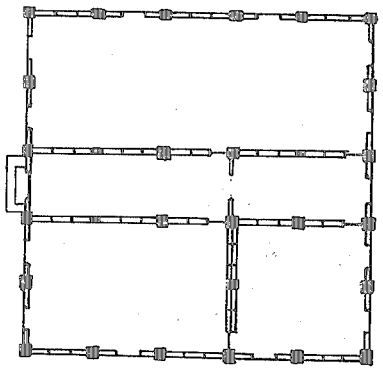

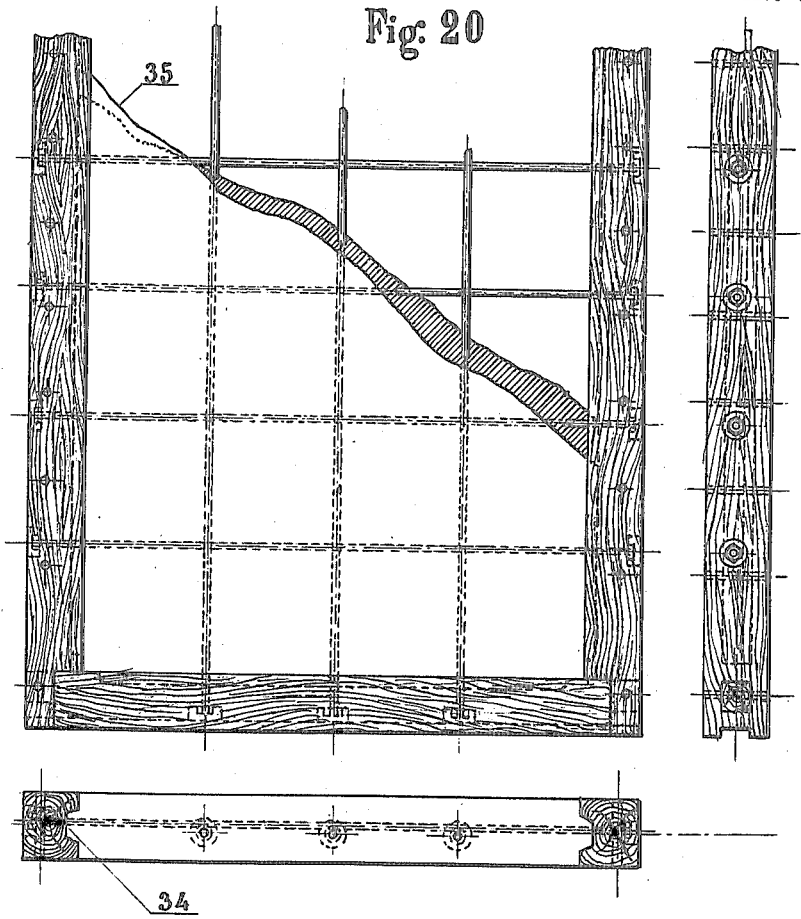
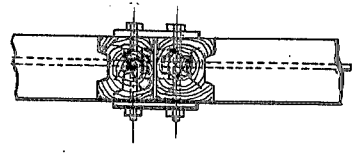
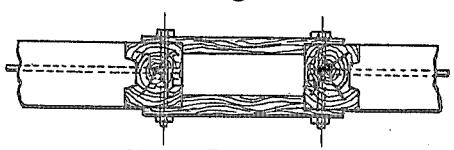
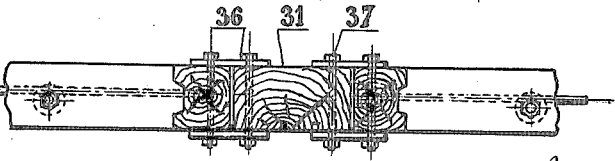

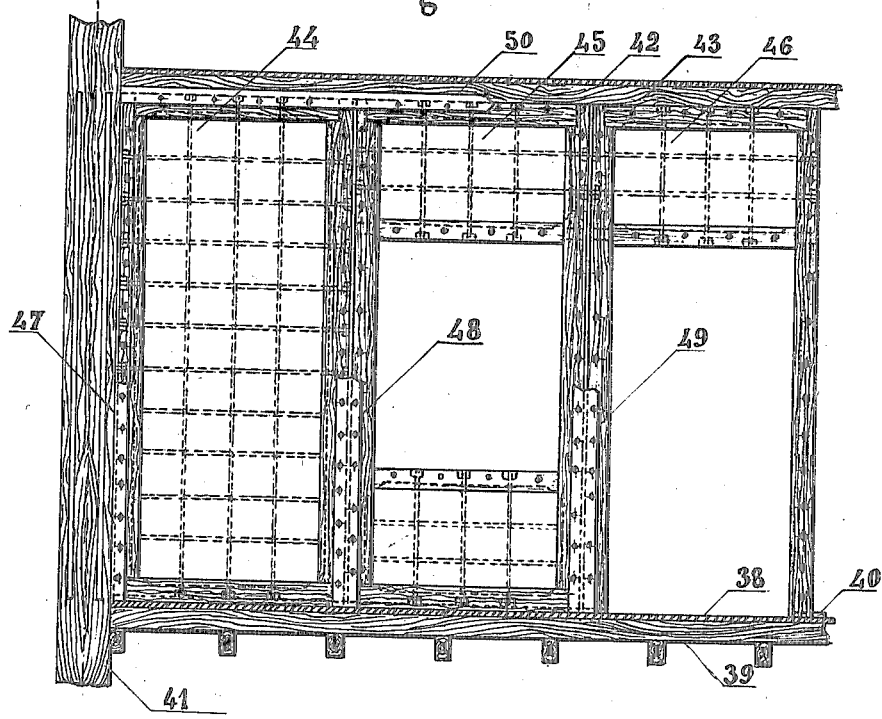
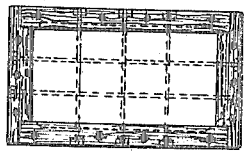

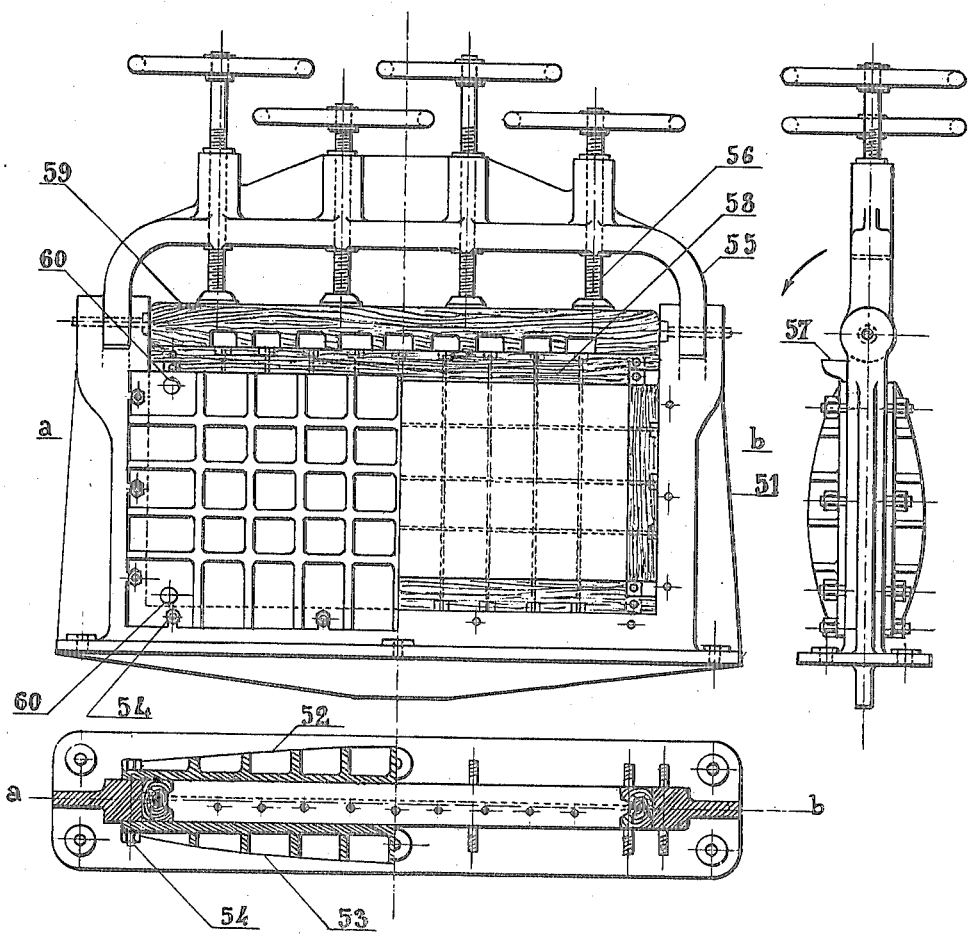

Patented Jan. 9, 1923.

1,441,970

UNITED STATES PATENT OFFICE.

JOSEPH D'AUTEMARRE D'ERVILLÉ, OF CHARENTON, FRANCE.

BLOCK AND PANEL FOR KNOCKDOWN STRUCTURES.

Application filed June 30, 1920. Serial No. 393,154.

*To all whom it may concern:*

Be it known that I, JOSEPH D'AUTEMARRE D'ERVILLÉ, a citizen of the Republic of France, residing at 42 Rue de Paris, Charenton, Seine, France, have invented a new and useful Block and Panel for Knockdown Structures, of which the following is a specification.

This invention relates to improvements in building blocks and in panels in which said blocks are employed, and which form structural units which are readily demountable and which are especially adapted for use in building houses of the knock-down type, one object of the invention being to effect improvements in the construction of the blocks, another object being to effect improvements in the construction of the panels or units in which the blocks are employed, and another object being to provide a novel and improved form of wall or other like structure comprising standards and panels or structural units arranged between and secured to said standards.

With the above and other objects in view, the invention consists in the construction, combination and arrangement of devices hereinafter described and claimed.

In the accompanying drawings:—

Fig. 1 is an elevation of a portion, to wit, one corner of a panel embodying blocks and a frame constructed and arranged in accordance with one form of my invention.

Fig. 1½ is a horizontal sectional view of same.

Fig. 2 shows a block employed for this mounting.

Fig. 3 represents the half of a block required for breaking the joints.

Fig. 4 shows a block having a length and a half for the same object.

Fig. 5 illustrates a block of substantially the same construction as the one of Fig. 2, but for small thicknesses, being employed on the edge.

Fig. 6 is the same view but with fittings.

Fig. 7 represents the lower corner of a panel mounted with this last kind of block and joined to a standard being a part of the construction skeleton.

Fig. 8 is a section of another standard of stronger shape.

Fig. 9 is an elevational view of the whole of another panel mounted with large square blocks or slabs, the base only being represented.

Fig. 10 is a view of a slab.

Figs. 11 to 14 are sections of grooved standards for establishing partitions in different directions.

Fig. 15 is a mounting of panels on the skeleton standards, same being different from the one represented in Fig. 7.

Figs. 16 and 17 show the possibility of changing in a construction some of the panels, the others remaining fixed.

Fig. 20 is a view of a panel moulded in a single block, said view being in elevation and plan.

Fig. 21 represents the junction of two panels side by side.

Figure 18:
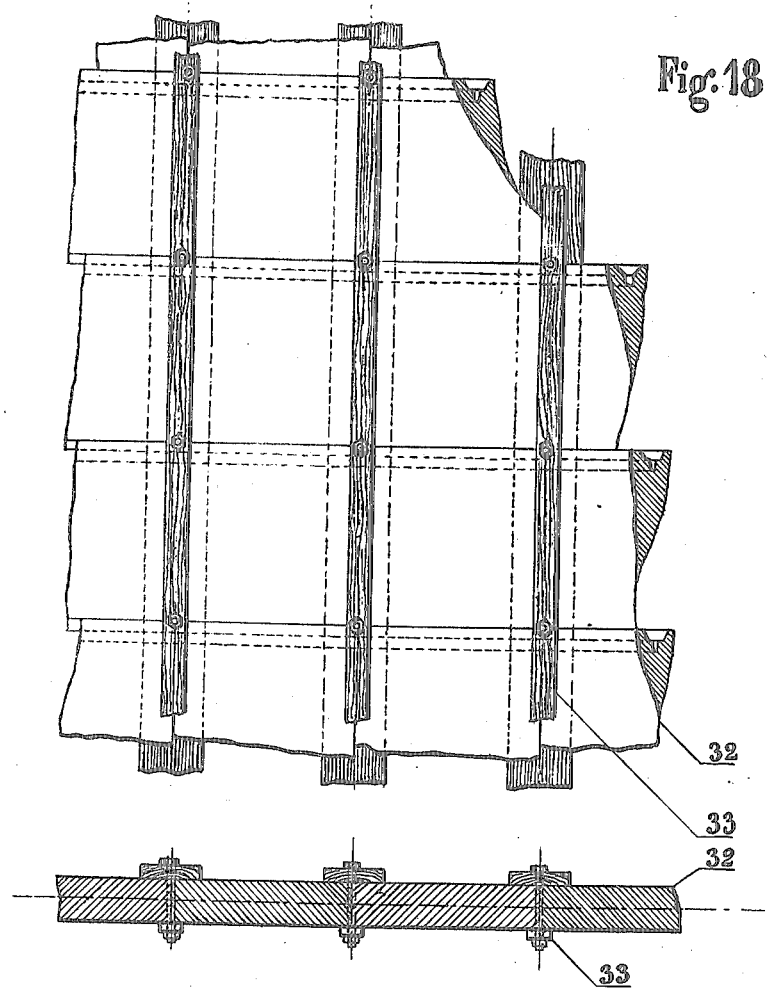
Fig. 18 represents the mounting of blocks for ceilings.

Fig. 22 the assembling of two panels through two pieces, one on either side and leaving a space corresponding to the thickness of a skeleton standard.

Fig. 23 their assembling to a secondary standard which does not belong to said skeleton.

Fig. 24 shows a whole mounting between floor and ceiling of a solid panel, of one for a window and another for the door.

Fig. 25 is a fourth of a panel which can be used with a window or over a door.

Fig. 26 indicates the way of manufacturing with a press, these panels moulded in a single piece.

Referring to the drawings, Fig. 1 gives a view of the whole mounting of a panel, only a corner of which is represented.

The joints between the blocks are broken and the rods constituting the braces pass through the standards and are tightened by nuts which can project from or be embedded in the thickness of the wood.

The block illustrated in Fig. 2 is provided with a central groove 1 and two holes 2 and 3 disposed symmetrically on either side, at the fourth, or three-fourths, as well on the length as on the width.

The blocks are arranged in horizontal courses, and to break joints, as shown. The horizontal tie and brace rods are only introduced every other course, as shown in Fig. 1.

Half blocks, Fig. 3, and blocks of one length and a half may be provided for permitting the breaking of the joints.

It is to be noted that no groove is to be seen exteriorly nor does any remain unused. The holes are symmetrical on either side of the grooves and the tightening of the rods is uniformly distributed.

Fig. 5 represents a kind of block in which the groove is on one edge and the holes are vertical.

According to Fig. 6 it is contemplated to effect the mounting without using a binding material. Therefore, it will be easily understood that in this case, for having a perfect contact, it is required that the faces of the blocks be sufficiently neat for being pressed between themselves by the tightening of the vertical and horizontal brace and tie rods.

It results that if this is obtained at the beginning of the mounting, the materials being new, a modification can take place afterwards, owing to the fact that the standards, if they are made of wood, can work on account of the inclemencies to which they are subjected.

Then the brace and tie rods follow in a certain measure the movement and some spaces can be seen between the blocks. To obviate this I provide the following means where the fittings are disposed on the faces and on end, the sides remaining smooth.

They are placed on the same axis as the blocks and to a groove of one side 4 will be opposed a shoulder of the other 5 for insuring the continuity of the mounting. The holes will be on the same side of the axis, the groove of the rod on the other, and the width at the top of the fitting will provide that the section of said fitting is trapezoidal.

For this block as for the preceding kind, half blocks or blocks having a length and a half will be provided for breaking the joints.

On the view in elevation, it can be seen that the blocks are of the kind according to Fig. 6. For each course a horizontal rod is provided. The blocks of the edges begin just at the standards, one of which has a shoulder and the opposed one a groove, as shown.

According to the view in plan, it will be noticed that the fittings are horizontal and a structure of great strength is secured, the blocks constituting together with the standards a structure or structural units which will not undergo deformations owing to changes of temperature.

The mounting of the panels is as follows:—On one side, the standards 6 of the skeleton are in the form of a cross, viewed in plan, or if they are required to be stronger, they will have a section according to Fig. 8.

On the other side, the nuts 7 of the rods are embedded in the frame members 8, having a thickness equal to one of the blocks. This frame is provided exteriorly on each side with a groove 9 leaving a width similar to that of the cross arms. The panels are slightly shorter than the space between two standards.

In the spaces between the frame members and the standard pass from place to place bolts 10 for tightening two strips 11 of metal or wood arranged on opposite sides of the joints and bearing on said frame members and standard.

It would be possible to introduce under the tightening strips a sheet of rubber, asbestos or leather-cloth, or any other material constituting a joint, should this be desired. The panels need be assembled to the construction skeleton only on the sides and the top. The bottom has a single groove 12, seen in section, which will fit in a strip fixed to the floor.

Fig. 9 shows another modified form of panels. The difference with the two preceding forms being that only horizontal rods 12 are used to unite the opposed standards 13. The blocks have the form of slabs, all of the same size. The vertical joints in this event are crossed but continue in a straight line from the base, and two wooden rods 14 and 15 are used to insure on either side the overlapping of these joints and would be at each set tightened through bolts 16.

The upper and lower crosspieces of the frame will be fitted by tenons and mortises in the ends of the standards, in order that the putting in place may be effected in the direction of the tightening of the brace and tie rods.

In Fig. 10 the two vertical sides are smooth. The under side has a shoulder of trapezoidal form 18 and the top has a groove 19 of same form for the fitting. At the bottom of said groove there is another smaller groove 20 for the passage of the rod of the required width, but having a greater depth to allow for play.

Said slabs are all mounted in the same direction, the shoulder of the under set being introduced in a groove of the crosspiece of the frame. The edges of the slabs have beveled corners 21 to permit the passage of the tightening bolt for the wooden members.

The assembling of the panels on the standards of the skeleton may be done by means of the overlapping strips 11, but a modification of the arrangement shown in Fig. 15 enables them to be fixed by bolts on the panel standards. They then bear in the grooves 22 on the faces of the skeleton standards.

It would also be possible to give two directions on right angle as on Fig. 11, or in prolongation as in Fig. 12, or in three directions, Fig. 13, or four, Fig. 14.

This arrangement is advantageous as it leaves no space between the panels and the standard, where the dust could accumulate, and also enables the standards to be of square section instead of being cross shaped, and to avoid waste in manufacturing.

The panel being demountable presents the advantage of enabling the inner arrangement of a house or other structure to be modified at will, without rearranging the skeleton.

For instance in Fig. 16 representing a plan of a small construction, should the rooms 23 and 24 be found too small, a change can be effected with respect to the room 23 by pivoting the panel 25 on one side, and for the room 24, the panel 26 may be drawn back until it comes adjacent to the next one. It will so become of no use and having but a slight thickness, it will not be an appreciable obstruction.

In Fig. 16, 27 indicates corner standards; 28 indicates intermediate standards; 29 indicates standards from which walls extend in three directions, and 30 indicates standards from which walls extend in four directions. Furthermore it will be noted that the spaces between the standards admit of the introduction of three panels.

31 indicates an intermediate standard which does not belong to the skeleton; it is of the same width as the chief standards, but has the thickness of the frames as shown in Fig. 23.

Figure 19:
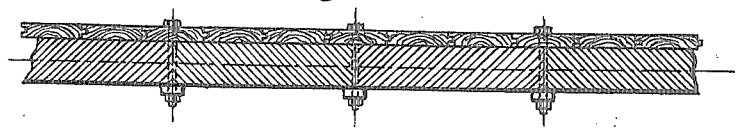
Fig. 19 is a modified form in this kind of ceiling.

Fig. 18 is a bottom plan view and a section showing the slabs applied to a ceiling. This last can be either in open work, as shown in said figure, or formed by means of joined boards, as shown in Fig. 19, and provided with a covering of cork slabs 32. The joint thus provided has smooth faces; those provided with fittings being perpendicular. Overlapping strips 33 may be arranged under the joints and secured to the floor by bolts.

Fig. 20 represents a panel moulded in one piece, the advantage of this arrangement being in the economy of manufacturing, and the same would be employed in cases where the sizes of the same would not be an obstacle in transportation.

The four pieces of the frame have interior grooves 34 for retaining the agglomerated material 35.

Figs. 21 to 25 are common to all kinds of panels hereinbefore described. Fig. 21 represents two panels side by side, joined and leaving a space corresponding to the thickness of a skeleton standard. Fig. 22 shows their junction by means of lengthening pieces leaving a space corresponding to the thickness of a skeleton standard. Fig. 23 shows the introduction between them of a secondary standard which does not belong to the skeleton of the construction. In this case, the bolts 36 and 37 crossing this standard are optional and the overlapping strips could only be secured on the frames, as in the construction shown in Fig. 15.

Fig. 24 represents a complete mounting between floor and ceiling of three different panels.

38 indicates the floor with a cross piece 39; 40 the strip; 41 the standard being a part of the skeleton; 42 the ceiling with a crossbeam 43; 44, 45, 46 indicate the panels, the first being solid for the whole, the second only to the half with a central blank for the introduction of a window, the third having only about a fourth of its height filled in order to provide for a door.

The overlapping strips on the sides are seen in 47, 48, 49 and on the top in 50.

Fig. 25 shows a panel of the same width as the others but of less height, and especially adapted for use in forming door or window openings.

Fig. 26 represents means for manufacturing the panels moulded in a single block. It comprises a press of suitable type. Said figure represents a screw press. The same is composed of a casing 51 bearing a rocking cross piece on which the screws are fixed. The casing, except at the base, is of the same thickness as the panels and of sufficient size to contain one laid down and one on edge; or it may be of greater thickness and so large as to contain several panels separated by intermediate ones. It is completed by two demountable jaws 52 and 53 placed on each side.

When employed in manufacturing the panels, said jaws are demounted, or at least one of same, a panel is introduced with its rods, but with the upper side not yet placed, and the two lower joints being not secured. The jaws are then put into place and secured by ordinary or wing bolts 54. The cross piece 55 for the screws 56 is put in place and bears on two stops 57. The mixture to be agglomerated is introduced in the space formed by the jaws and tamped until the level of the cross piece tenon is reached.

This being effected, the side 58 is arranged in place, the rods are engaged in the holes, and the tenons are placed in the mortises of the cross-members. An intermediate piece of wood 59 provided with empty parts is placed on the panel, the rods are secured to the nuts and the screws of the press are then operated from time to time as required during the tightening process.

It will be understood that various changes concerning details could take place without altering the principle of the invention, as for instance concerning the material used, which may not be necessarily granulated cork, but a compound of different products being light and insulating; also the one that could reside in providing a circulation of steam in the jaws of the press in order to accelerate the drying.

What I claim is:—

1. A structural unit comprising a panel composed of blocks arranged in courses, a frame in which said blocks are enclosed, vertical tie and brace rods connecting the upper and lower members of the frame and passing through openings in the blocks, and horizontal tie and brace rods connecting the vertical end members of the frame and arranged in grooves in the opposing sides of certain of the blocks.

2. A structural unit comprising a panel composed of blocks arranged in courses, a frame in which said blocks are enclosed, vertical tie and brace rods connecting the upper and lower members of the frame and movably connected to the blocks, and horizontal tie and brace rods connecting the vertical end members of the frame and arranged in grooves in the opposing sides of certain of the blocks.

3. A structural unit comprising a panel composed of blocks arranged in courses, a frame in which said blocks are enclosed, vertical tie and brace rods connecting the upper and lower members of the frame and movably connected to the blocks, horizontal tie and brace rods connecting the vertical end members of the frame and arranged in grooves in the opposing sides of certain of the blocks, and a standard to which one of the vertical end members of the unit frame is attached.

4. A structural unit comprising a panel composed of blocks arranged in courses, a frame in which said blocks are enclosed, vertical tie and brace rods connecting the upper and lower members of the frame and movably connected to the blocks, horizontal tie and brace rods connecting the vertical end members of the frame and arranged in grooves in the opposing sides of certain of the blocks, a standard to which one of the vertical end members of the unit frame is attached, and connecting means between said end member and standard and covering the joint between them.

In witness whereof I affix my signature.

JOSEPH d'AUTEMARRE d'ERVILLÉ.